(12) United States Patent
Zhao et al.

(10) Patent No.: US 11,836,065 B2
(45) Date of Patent: Dec. 5, 2023

(54) METHOD AND APPARATUS FOR TESTING STRESS BASED ON CLOUD SERVICE

(71) Applicant: Beijing Baidu Netcom Science and Technology Co., Ltd., Beijing (CN)

(72) Inventors: Yi Zhao, Beijing (CN); Chaoping Ji, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 200 days.

(21) Appl. No.: 17/397,059

(22) Filed: Aug. 9, 2021

(65) Prior Publication Data

US 2021/0390029 A1 Dec. 16, 2021

(30) Foreign Application Priority Data

Mar. 24, 2021 (CN) .......................... 202110315147.X (51) Int. Cl.
  *G06F 11/34* (2006.01)
  *H04L 43/0817* (2022.01)

(52) U.S. Cl.
  CPC ...... *G06F 11/3433* (2013.01); *G06F 11/3414* (2013.01); *H04L 43/0817* (2013.01)

(58) Field of Classification Search
  CPC ..... H04L 43/50; H04L 43/55; H04L 43/0817; H04L 41/5054; G06F 11/3006; G06F 11/3409; G06F 11/3414; G06F 11/3433; G06F 11/3672; G06F 11/3684; G06F 11/3688; G06F 11/3692; G06F 2201/81; Y02A 10/40
  USPC ........................................................ 702/186
  See application file for complete search history.

(56) References Cited

U.S. PATENT DOCUMENTS

| 10,838,840 B2* | 11/2020 | M ........................ G06F 11/3006 |
| 2017/0004226 A1* | 1/2017 | Skoglund ................ G06F 17/18 |
| 2019/0087301 A1 | 3/2019 | M et al. |

FOREIGN PATENT DOCUMENTS

| CN | 108959000 A | 12/2018 |
| CN | 110162471 A | 8/2019 |
| CN | 111343048 A | 6/2020 |
| CN | 111597117 A | 8/2020 |

(Continued)

OTHER PUBLICATIONS

European Search Report dated Feb. 8, 2022 in corresponding European Patent Application No. 21191127.6 (nine pages).

(Continued)

*Primary Examiner* — John H Le
(74) *Attorney, Agent, or Firm* — Kilpatrick Townsend & Stockton LLP (57) ABSTRACT

The present disclosure discloses a method and apparatus for testing a stress based on a cloud service, and relates to the field of cloud computing technology, and further to the field of cloud operation and maintenance technology. A particular implementation comprises: acquiring, based on first stress test information of a business system in a cloud service, a number of expected stress test nodes corresponding to the business system; creating edge computing nodes, a number of the edge computing nodes being identical to the number of the expected stress test nodes; and performing a stress test on the business system by using the edge computing nodes, to acquire second stress test information of the business system.

17 Claims, 4 Drawing Sheets

(56) References Cited

FOREIGN PATENT DOCUMENTS

| | | |
|---|---|---|
| CN | 111625443 A | 9/2020 |
| CN | 111651357 A | 9/2020 |
| WO | 2016/048394 A1 | 3/2016 |

OTHER PUBLICATIONS

PTS (Performance Testing Services), "Introduction of Performance Testing Service Method of Aliyun," https://blog.csdn.net/vunqiinsight/article/details/110221950; pp. 1-8, (Nov. 27, 2020).

* cited by examiner

Fig. 5

METHOD AND APPARATUS FOR TESTING STRESS BASED ON CLOUD SERVICE

CROSS-REFERENCE TO RELATED APPLICATIONS

This application claims priority to Chinese Patent Application No. 202110315147.X, filed with the China National Intellectual Property Administration (CNIPA) on Mar. 24, 2021, the contents of which are incorporated herein by reference in their entirety.

TECHNICAL FIELD

The present disclosure relates to the field of cloud computing technology, and further to the field of cloud operation and maintenance technology.

BACKGROUND

With the rapid development of cloud business, more and more enterprises select a cloud server as a first choice for infrastructures, and thus, more and more operation and maintenance management needs would also be based on the architecture of the cloud server. Further, a performance evaluation is a relatively common need in the field of operation and maintenance, and a main means is to evaluate a capacity level of a system and the performance capability of a service through a performance test. Then, a customer optimizes a capacity by expanding a service capacity or tuning a program, to deal with problems such as a peak of traffic and a performance degradation. After an analysis for market customers, it is found that there are more needs for an evaluation in scenarios such as performance testing and performance bottleneck positioning for a launch of a new product, a peak of promotional activity, and a complex behavior.

At present, the core idea of a method of measuring a performance index of a service deployed on a cloud is to perform a stress test on the service deployed on the cloud. As to the implementation, a standalone stress test tool is used to perform the stress test on the service. The initiation of the stress test is generally implemented by: using a single physical machine to start a plurality of threads on the physical machine to initiate the stress test; deploying machine rooms in a plurality of regions and performing resource scheduling on the machine rooms to initiate the stress test; or deploying a container on a plurality of physical machines or cloud servers.

SUMMARY

The present disclosure provides a method and apparatus for testing a stress based on a cloud service, an electronic device and a storage medium.

In a first aspect, an embodiment of the present disclosure provides a method for testing a stress based on a cloud service, and the method comprises: acquiring, based on first stress test information of a business system in a cloud service, a number of expected stress test nodes corresponding to the business system; creating edge computing nodes, a number of the edge computing nodes being identical to the number of the expected stress test nodes; and performing a stress test on the business system by using the edge computing nodes, to acquire second stress test information of the business system.

In a second aspect, an embodiment of the present disclosure provides an apparatus for testing a stress based on a cloud service, and the apparatus comprises: an acquiring module, configured to acquire, based on first stress test information of a business system in a cloud service, a number of expected stress test nodes corresponding to the business system; a creating module, configured to create edge computing nodes, a number of the edge computing nodes being identical to the number of the expected stress test nodes; and a testing module, configured to perform a stress test on the business system by using the edge computing nodes, to acquire second stress test information of the business system.

In a third aspect, an embodiment of the present disclosure provides an electronic device, and the electronic device comprises: at least one processor; and a memory communicatively connected with the at least one processor, where the memory stores instructions executable by the at least one processor, and the instructions, when executed by the at least one processor, cause the at least one processor to execute the method for testing a stress based on a cloud service as described in any one of the implementations of the first aspect.

In a fourth aspect, an embodiment of the present disclosure provides a non-transitory computer readable storage medium storing computer instructions, where the computer instructions cause a computer to execute the method for testing a stress based on a cloud service as described in any one of the implementations of the first aspect.

In a fifth aspect, an embodiment of the present disclosure provides a computer program product, comprising a computer program, wherein the computer program, when executed by a processor, implements the method for testing a stress based on a cloud service as described in any one of the implementations of the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
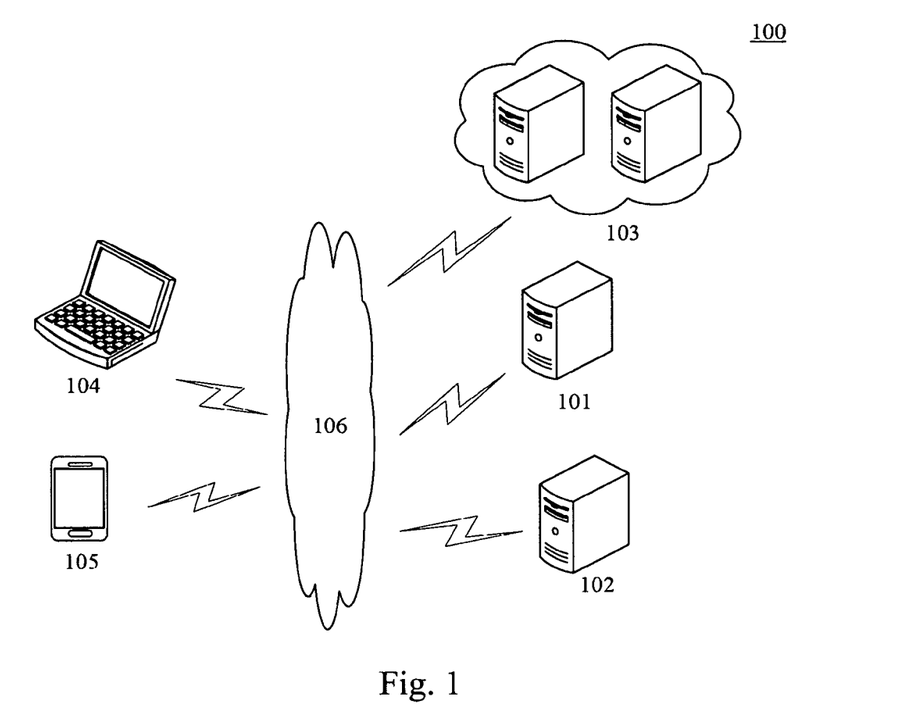
FIG. 1 is a diagram of an exemplary system architecture in which the present disclosure may be applied.

FIG. 1 illustrates an exemplary system architecture 100 in which an embodiment of a method for testing a stress based on a cloud service according to the present disclosure may be applied.

As shown in FIG. 1, the system architecture 100 may include terminal devices 104 and 105, a network 106, servers 101 and 102, and a cloud service 103. The network 106 serves as a medium providing a communication link between the terminal devices 104 and 105, the servers 101 and 102, and the cloud service 103. The network 106 may include various types of connections, for example, wired or wireless communication links, or optical fiber cables.

The terminal devices 104 and 105 may interact with the servers 101 and 102 and the cloud service 103 via the network 106 to receive or send a message. Various applications (e.g., a search application, a data collection application, a data processing application, an instant communication tool, social platform software, and a shopping application) may be installed on the terminal devices 104 and 105.

The servers 101 and 102 may be servers providing various services. For example, the servers 101 and 102 may be backend servers receiving a request sent by a terminal device communicated with the servers 101 and 102. The backend servers may perform processing such as receiving and analyzing on the request sent by the terminal device, and generate a processing result.

The servers 101 and 102 interact with the cloud service 103 to acquire first stress test information of a business system in the cloud service 103. The first stress test information may be configuration information related to the business system. The servers 101 and 102 may acquire a number of expected stress test nodes corresponding to the business system according to the first stress test information of the business system, and then create the same number of edge computing nodes at a side of the network close to the terminal devices 104 and 105 according to the number of the expected stress test nodes. The servers 101 and 102 send a stress test start instruction to the edge computing nodes, perform a stress test on the business system by using the edge computing nodes, and acquire, from the edge computing nodes, second stress test information after the test for the business system.

It should be noted that the servers may be hardware or software. When being the hardware, the servers may be various electronic devices that provide various services for the terminal devices. When being the software, the servers may be implemented as a plurality of pieces of software or a plurality of software modules that provide various services for the terminal devices, or may be implemented as a single piece of software or a single software module that provides various services for the terminal devices, which will not be particularly defined here.

It should be noted that the method for testing a stress based on a cloud service that is provided in the embodiments of the present disclosure may be performed by the servers 101 and 102. Correspondingly, an apparatus for testing a stress based on a cloud service may be provided in the servers 101 and 102.

It should be appreciated that the numbers of the terminal devices, the networks, and the servers in FIG. 1 are merely illustrative. Any number of terminal devices, networks, servers and cloud services may be provided based on actual requirements.

Figure 2:
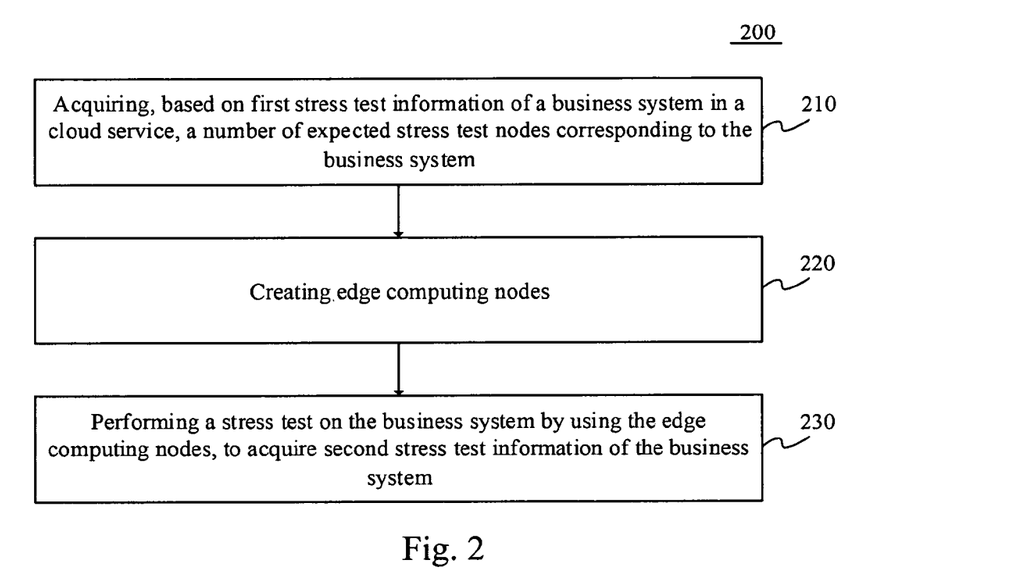
FIG. 2 is a flowchart of an embodiment of a method for testing a stress based on a cloud service according to the present disclosure.

Referring to FIG. 2, FIG. 2 is a schematic flow diagram 200 of an embodiment of a method for testing a stress based on a cloud service that may be applied to the present disclosure. The method for testing a stress based on a cloud service includes the following steps:

Step 210, acquiring, based on first stress test information of a business system in a cloud service, a number of expected stress test nodes corresponding to the business system.

Here, the cloud service may be addition, usage and interaction modes of an Internet-based related service, and generally relate to provision of a dynamically scalable and often virtualized resource through the Internet. The cloud service refers to that a desired service is obtained over a network in an on-demand and scalable manner. The cloud service may put software, hardware and data information that are required by an enterprise into a cloud network to construct a corresponding business system. A cloud service provider provides a service resource to the enterprise, the service resource including a server, a virtual machine, a network segment, and the like.

In this embodiment, an executing body (e.g., the server 101 or 102 in FIG. 1) of the method for testing a stress based on a cloud service may determine a to-be-tested business system in the cloud service, and acquire the first stress test information of the business system by performing a detection or an information acquisition on the business system in the cloud service. The first stress test information may be related configuration information used to perform a stress test on the business system, and may include stress test node information used to determine a number of stress test nodes and stress test link information used to initiate the stress test to the business system. The above executing body may determine a number of expected stress test nodes for the business system according to the first stress test information of the business system, to acquire the number of the expected stress test nodes corresponding to the business system. The number of the expected stress test nodes may be a number for representing stress test nodes required when the stress test is performed on the business system.

Step 220, creating edge computing nodes.

In this embodiment, after acquiring the number of the expected stress test nodes corresponding to the business system, the above executing body may create edge computing nodes at a side of the network close to a user side according to the number of the expected stress test nodes. The number of the edge computing nodes is identical to that of the expected stress test nodes. Here, the edge computing node refers to a business platform constructed at an edge side of the network close to the user side, and the business platform provides a resource such as a storage resource, a computing resource and a network resource, to sink some critical business applications to the edge of an access network. The position of the edge computing node is between the user side and the cloud service, and thus, the width and delay loss caused by network transmission and multi-stage forwarding may be reduced. The edge computing node is closer to the user side than a traditional cloud service edge node.

Step 230, performing a stress test on the business system by using the edge computing nodes, to acquire second stress test information of the business system.

In this embodiment, after creating the same number of edge computing nodes according to the number of the expected stress test nodes, the above executing body may send a stress test start instruction to the edge computing nodes.

After the edge computing node receives the stress test start instruction, a stress test tool is deployed according to the stress test start instruction, and the stress test tool may be deployed on the edge computing node in the form of a container. After the deployment of the stress test tool is completed, the edge computing node performs the stress test on the business system according to the stress test link information. The stress test link information may include an interface (api) of the business system, link information, and the like. That is, the edge computing node initiates the stress test to the business system by using the interface of the business system and the link information, and obtains the second stress test information after the test. The second stress test information refers to test information of the business system that is obtained after the stress test is performed on the business system. The edge computing node returns the second stress test information after the test to the above executing body.

The above executing body acquires the second stress test information of the business system from the stress test tool on the edge computing node, after the edge computing node completes the stress test for the business system.

According to the method for testing a stress based on a cloud service provided in the embodiment of the present disclosure, the number of the expected stress test nodes corresponding to the business system is acquired based on the first stress test information of the business system in the cloud service. Then, the edge computing nodes are created, and the number of the edge computing nodes is identical to that of the expected stress test nodes. Finally, the stress test is performed on the business system by using the edge computing nodes, to acquire the second stress test information of the business system. Accordingly, the stress test performed on the business system in the cloud service is implemented. The edge computing nodes may relate to a plurality of regions and a plurality of operators, a very complete multi-region stress test initiation may be implemented without building a machine room, and the connection for the stress test initiation would not fail due to a region problem. Thus, the stress test simultaneously performed on business systems in the plurality of regions may be satisfied. In addition, the stress test tool may be deployed on a stress test initiation node, and the deployment environment of the stress test tool is consistent even without a manual operation or script operation.

As an alternative implementation, the above first stress test information in the present disclosure may include a plurality of pieces of expected stress test region information of the business system and stress test node information corresponding to each piece of expected stress test region information. Here, the expected stress test region information may refer to region information receiving a request from the user side when the stress test is performed on the business system, that is, target region information expected in the stress test this time. The stress test node information may be business information used to determine a number of expected stress test nodes required for the stress test. An expected stress test node refers to a stress test initiation node required for the stress test this time in each expected stress test region and, and the number of the expected stress test nodes refers to a number of stress test initiation nodes. The stress test node information may include stress test configuration information in the business system. The stress test node information may include network information corresponding to the each piece of expected stress test region information, for example, a network operator corresponding to each region. The stress test node information may further include stress test weight information corresponding to the each piece of expected stress test region information. The stress test weight information may refer to a proportion of the each piece of expected stress test region information receiving the request from the user side when the stress test is performed on the business system. Different expected stress test region information corresponds to different weight information. The stress test weight information may be configuration information preset in the business system by a testing personnel. The stress test node information may further include expected concurrency number information, the expected concurrency number information refers to a target concurrency number set when the stress test is performed on the business system, and the target concurrency number is a number of received requests of the user side.

In addition, the step 210 "acquiring, based on first stress test information of a business system in a cloud service, a number of expected stress test nodes corresponding to the business system" in FIG. 2 may include: acquiring, for the each piece of the expected stress test region information, a number of the expected stress test nodes of the expected stress test region information based on the stress test node information corresponding to the each piece of expected stress test region information.

Particularly, the above executing body may acquire the first stress test information, including the plurality of pieces of expected stress test region information of the business system and the stress test node information corresponding to the each piece of the expected stress test region information, by performing the detection or the information acquisition on the business system in the cloud service, and calculate, for the each piece of expected stress test region information, a number of corresponding expected stress test nodes by using the first stress test information corresponding to the expected stress test region information, respectively. That is, the above executing body may acquire the number of the expected stress test nodes of the each piece of expected stress test region information according to the stress test node information corresponding to the each piece of expected stress test region information.

Figure 3:
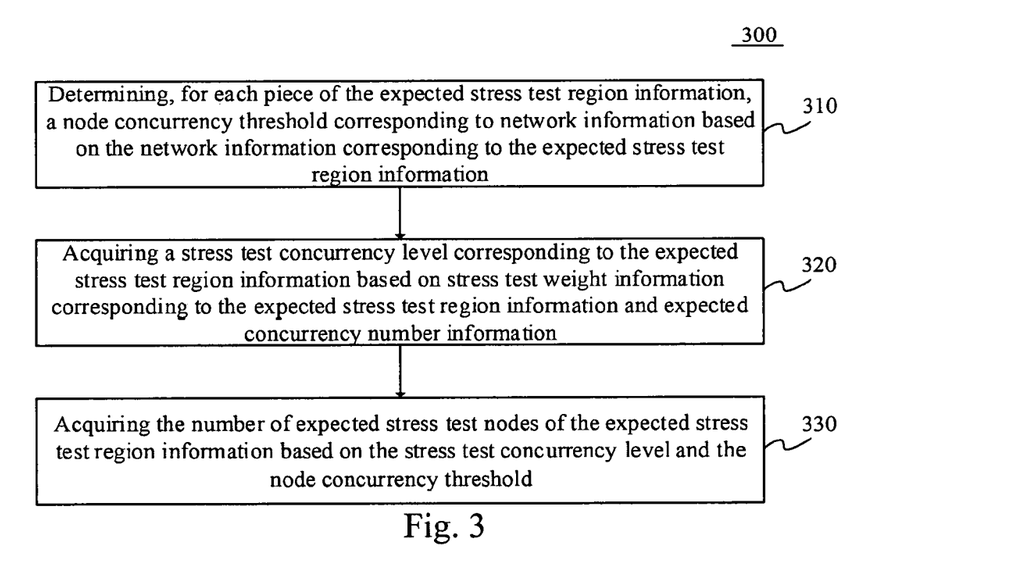
FIG. 3 is a flowchart of an embodiment in which a number of expected stress test nodes is acquired, according to the present disclosure.

As an alternative implementation, further referring to FIG. 3, FIG. 3 shows a step of acquiring a number of expected stress test nodes of each piece of expected stress test region information. The step may include the following steps:

Step 310, determining, for each piece of the expected stress test region information, a node concurrency threshold corresponding to network information based on the network information corresponding to the expected stress test region information.

Here, the each piece of the expected stress test region information corresponds to unique network information, that is, the each piece of expected stress test region information corresponds to a unique network operator. The network node of each network operator has a certain request response threshold, that is, the network node of the each network operator may process a preset number of request responses. The preset number is a processing threshold corresponding to network information, that is, the node concurrency threshold corresponding to the network information. The node concurrency threshold corresponding to each piece of network information is preset by the network operator.

In this step, by performing a detection or an information acquisition on a business system in a cloud service, the above executing body may acquire a plurality of pieces of the expected stress test region information of the business system and network information corresponding to each piece of the expected stress test region information. According to the network information of the each piece of expected stress test region information, the above executing body may respectively determine a node concurrency threshold at which the network information of the each piece of expected stress test region information may process the request responses.

Step 320, acquiring a stress test concurrency level corresponding to the expected stress test region information based on stress test weight information corresponding to the expected stress test region information and expected concurrency number information.

In this step, by performing the detection or the information acquisition on the business system in the cloud service, the above executing body may acquire the stress test weight information corresponding to the each piece of the expected stress test region information and the expected concurrency number information. For the each piece of the expected stress test region information, the above executing body may input the stress test weight information corresponding to the expected stress test region information and the expected concurrency number information into a concurrency level calculation formula, to calculate and obtain the stress test concurrency level corresponding to the inputted expected stress test region information. The concurrency level calculation formula may be a formula used to calculate a stress test concurrency level corresponding to the expected stress test region information. In the concurrency level calculation formula, a ratio of the stress test weight information corresponding to the inputted expected stress test region information to the stress test weight information of all expected stress test region information may be multiplied by an expected concurrency number. That is, the concurrency level calculation formula may be:

$$\text{stress test concurrency level of the expected stress test region information} = \frac{\text{stress test weight of the expected stress test region information}}{\text{stress test weights of all expected stress test region information}} * \text{expected concurrency number information}$$

Step 330, acquiring a number of the expected stress test nodes of the expected stress test region information based on the stress test concurrency level and the node concurrency threshold.

In this step, after acquiring the stress test concurrency level corresponding to the each piece of the expected stress test region information and the node concurrency threshold corresponding to the network information, the above executing body may input, for the each piece of expected stress test region information, the stress test concurrency level corresponding to the expected stress test region information and the node concurrency threshold into a node number calculation formula, to calculate and obtain the number of the expected stress test nodes corresponding to the inputted expected stress test region information. The node number calculation formula may be a formula used to calculate a number of expected stress test nodes of the expected stress test region information. The node number calculation formula may be a calculation for a ratio of the stress test concurrency level corresponding to the inputted expected stress test region information to the node concurrency threshold. That is, the node number calculation formula may be:

$$\text{number of expected stress test nodes of the expected stress test region information} = \frac{\text{stress test concurrency level corresponding to the expected stress test region information}}{\text{node concurrency threshold}}$$

In this embodiment, the number of the expected stress test nodes of the each piece of the expected stress test region information is calculated and obtained through first stress test information of the business system. That is, a stress concurrency value is associated with the first stress test information of the business system. The change of the stress concurrency value may be implemented by only automatically expanding or reducing the number of the nodes according to the first stress test information configured by the business system, thereby improving the flexibility in adjusting the stress concurrency value.

As an alternative implementation, the above method for testing a stress further includes: releasing edge computing nodes, in response to detecting that the edge computing nodes are in an idle state within preset time.

Particularly, the above executing body may detect the working state of the edge computing nodes in real time, to detect whether the edge computing nodes are in the working state. When a stress test tool in the edge computing nodes performs a stress test on the business system, the edge computing nodes are in the working state. When the stress test tool in the edge computing nodes stops performing the stress test on the business system, the edge computing nodes are in the idle state, that is, there is no stress test task at present. By detecting the working state of the edge computing nodes in real time, the above executing body determines that the edge computing nodes are continuously in the idle state within the preset time. That is, if it is determined that there is no stress test task at present, the created edge computing nodes are released. When a new stress test task is received, new edge computing nodes are created.

In this implementation, the edge computing nodes are released when there is no stress test task, and the network resource is released when there is no need to perform the stress test, which does not make the resources idle. Moreover, the created edge computing nodes may control the capacity, and the edge computing nodes may be created as needed, which does not lead to a waste of the resources. Thus, the resource utilization rate is improved.

As an alternative implementation, the above method for testing a stress further includes: analyzing service performance of the business system based on second stress test information of the business system.

Particularly, after acquiring the second stress test information obtained through the stress test performed by the stress test tool in the edge computing nodes, the above executing body may analyze the service performance of the business system according to the second stress test information, and generate an analysis report for the service performance of the business system. The above executing body may send the analysis report to a user side, and present the analysis report to a testing personnel of corresponding to the business system.

In this implementation, the analysis for the performance of the business system is implemented through the second stress test information, thus implementing the analysis for the performance of the business system in the cloud service.

Figure 4:
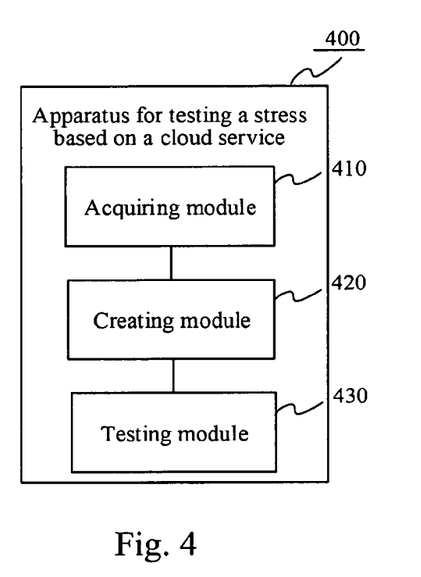
FIG. 4 is a schematic diagram of an embodiment of an apparatus for testing a stress based on a cloud service according to the present disclosure.

Further referring to FIG. 4, as an implementation of the method shown in the above drawings, the present disclosure provides an embodiment of an apparatus for testing a stress based on a cloud service. The embodiment of the apparatus corresponds to the embodiment of the method shown in FIG. 2, and the apparatus may be applied in various electronic devices.

As shown in FIG. 4, the apparatus 400 for testing a stress based on a cloud service in this embodiment includes: an acquiring module 410, a creating module 420 and a testing module 430.

Here, the acquiring module 410 is configured to acquire, based on first stress test information of a business system in a cloud service, a number of expected stress test nodes corresponding to the business system.

The creating module 420 is configured to create edge computing nodes, a number of the edge computing nodes being identical to the number of the expected stress test nodes.

The testing module 430 is configured to perform a stress test on the business system by using the edge computing nodes, to acquire second stress test information of the business system.

In some alternative implementations of this embodiment, the first stress test information comprises a plurality of pieces of the expected stress test region information of the business system and stress test node information corresponding to each piece of expected stress test region information. The acquiring module 410 is further configured to: acquire, for the each piece of the expected stress test region information, a number of the expected stress test nodes of the expected stress test region information based on the stress test node information corresponding to the expected stress test region information.

In some alternative implementations of this embodiment, the stress test node information comprises network information, stress test weight information, and expected concurrency number information. The acquiring module 410 is further configured to: determine, for the each piece of the expected stress test region information, a node concurrency threshold corresponding to the network information based on network information corresponding to the expected stress test region information; acquire a stress test concurrency level corresponding to the expected stress test region information based on stress test weight information corresponding to the expected stress test region information and the expected concurrency number information; and acquire the number of the expected stress test nodes of the expected stress test region information based on the stress test concurrency level corresponding to the expected stress test region information and the node concurrency threshold corresponding to the network information.

In some alternative implementations of this embodiment, the apparatus further comprises: a releasing module, configured to release the edge computing nodes, in response to detecting that the edge computing nodes are in an idle state within preset time.

In some alternative implementations of this embodiment, the apparatus further comprises: an analyzing module, configured to analyze service performance of the business system based on the second stress test information of the business system.

According to the apparatus for testing a stress based on a cloud service provided in the embodiment of the present disclosure, the number of the expected stress test nodes corresponding to the business system is acquired based on the first stress test information of the business system in the cloud service. Then, the edge computing nodes are created, and the number of the edge computing nodes is identical to that of the expected stress test nodes. Finally, the stress test is performed on the business system by using the edge computing nodes, to acquire the second stress test information of the business system. Accordingly, the stress test performed on the business system in the cloud service is implemented. The edge computing nodes may relate to a plurality of regions and a plurality of operators, a very complete multi-region stress test initiation may be implemented without building a machine room, and the connection for the stress test initiation would not fail due to a region problem. Thus, the stress test simultaneously performed on business systems in the plurality of regions may be satisfied. In addition, a stress test tool may be deployed on a stress test initiation node, and the deployment environment of the stress test tool is consistent even without a manual operation or script operation.

According to an embodiment of the present disclosure, the present disclosure further provides an electronic device, a readable storage medium, and a computer program product.

Figure 5:
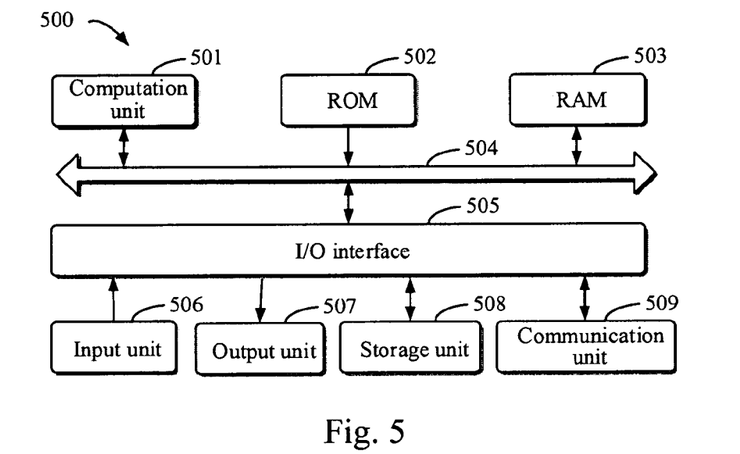
FIG. 5 is a block diagram of an electronic device used to implement a method for testing a stress based on a cloud service according to embodiments of the present disclosure.

FIG. 5 is a schematic block diagram of an exemplary electronic device 500 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 5, the electronic device 500 includes a computation unit 501, which may execute various appropriate actions and processes in accordance with a computer program stored in a read-only memory (ROM) 502 or a computer program loaded into a random access memory (RAM) 503 from a storage unit 508. The RAM 503 also stores various programs and data required by operations of the electronic device 500. The computation unit 501, the ROM 502 and the RAM 503 are connected to each other through a bus 504. An input/output (I/O) interface 505 is also connected to the bus 504.

The following components in the electronic device 500 are connected to the I/O interface 505: an input unit 506, for example, a keyboard and a mouse; an output unit 507, for example, various types of displays and a speaker; a storage unit 508, for example, a magnetic disk and an optical disk; and a communication unit 509, for example, a network card, a modem, a wireless communication transceiver. The communication unit 509 allows the electronic device 500 to exchange information/data with an other device through a computer network such as the Internet and/or various telecommunication networks.

The computation unit 501 may be various general-purpose and/or special-purpose processing assemblies having processing and computing capabilities. Some examples of the computation unit 501 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 501 performs the various methods and processes described above, for example, the method for testing a stress based on a cloud service. For example, in some embodiments, the method for testing a stress based on a cloud service may be implemented as a computer software program, which is tangibly included in a machine readable medium, for example, the storage unit 508. In some embodiments, part or all of the computer program may be loaded into and/or installed on the electronic device 500 via the ROM 502 and/or the communication unit 509. When the computer program is loaded into the RAM 503 and executed by the computation unit 501, one or more steps of the above method for testing a stress based on a cloud service may be performed. Alternatively, in other embodiments, the computation unit 501 may be configured to perform the method for testing a stress based on a cloud service through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for testing a stress based on a cloud service, comprising:

acquiring, based on first stress test information of a business system in the cloud service and for each piece of expected stress test region information, a number of expected stress test nodes of the expected stress test region information based on stress test node information corresponding to the expected stress test region information, wherein the first stress test information comprises a plurality of pieces of the expected stress test region information of the business system and the stress test node information corresponding to each piece of the expected stress test region information;

creating edge computing nodes, a number of the edge computing nodes being identical to the number of the expected stress test nodes, wherein the edge computing nodes refer to business platforms constructed at an edge side of a network close to a user side, and positions of the edge computing nodes are between the user side and the cloud service; and performing a stress test on the business system by using the edge computing nodes, to acquire second stress test information of the business system.

2. The method according to claim 1, wherein the stress test node information comprises network information, stress test weight information, and expected concurrency number information, and wherein the acquiring comprises:

determining, for the each piece of the expected stress test region information, a node concurrency threshold corresponding to network information based on the network information corresponding to the expected stress test region information;

acquiring a stress test concurrency level corresponding to the expected stress test region information based on stress test weight information corresponding to the expected stress test region information and the expected concurrency number information; and acquiring the number of the expected stress test nodes of the expected stress test region information based on the stress test concurrency level and the node concurrency threshold.

3. The method according to claim 2, further comprising:
releasing the edge computing nodes, in response to detecting that the edge computing nodes are in an idle state within preset time.

4. The method according to claim 2, further comprising:
analyzing service performance of the business system based on the second stress test information of the business system.

5. The method according to claim 1, further comprising:
releasing the edge computing nodes, in response to detecting that the edge computing nodes are in an idle state within preset time.

6. The method according to claim 1, further comprising:
releasing the edge computing nodes, in response to detecting that the edge computing nodes are in an idle state within preset time.

7. The method according to claim 1, further comprising:
analyzing service performance of the business system based on the second stress test information of the business system.

8. The method according to claim 1, further comprising:
analyzing service performance of the business system based on the second stress test information of the business system.

9. An electronic device, comprising:

at least one processor; and a storage device, communicated with the at least one processor, wherein the storage device stores an instruction executable by the at least one processor, and the instruction is executed by the at least one processor, to enable the at least one processor to perform an operation for testing a stress based on a cloud service, comprising:

acquiring, based on first stress test information of a business system in the cloud service and for each piece of expected stress test region information, a number of expected stress test nodes of the expected stress test region information based on stress test node information corresponding to the expected stress test region information, wherein the first stress test information comprises a plurality of pieces of the expected stress test region information of the business system and the stress test node information corresponding to each piece of the expected stress test region information;

creating edge computing nodes, a number of the edge computing nodes being identical to the number of the expected stress test nodes, wherein the edge computing nodes refer to business platforms constructed at an edge side of a network close to a user side, and positions of the edge computing nodes are between the user side and the cloud service; and performing a stress test on the business system by using the edge computing nodes, to acquire second stress test information of the business system.

10. The electronic device according to claim 9, wherein the stress test node information comprises network information, stress test weight information, and expected concurrency number information, and wherein the acquiring comprises:

determining, for the each piece of the expected stress test region information, a node concurrency threshold corresponding to network information based on the network information corresponding to the expected stress test region information;

acquiring a stress test concurrency level corresponding to the expected stress test region information based on stress test weight information corresponding to the expected stress test region information and the expected concurrency number information; and acquiring the number of the expected stress test nodes of the expected stress test region information based on the stress test concurrency level and the node concurrency threshold.

11. The electronic device according to claim 10, the operation further comprising:
releasing the edge computing nodes, in response to detecting that the edge computing nodes are in an idle state within preset time.

12. The electronic device according to claim 10, the operation further comprising:
analyzing service performance of the business system based on the second stress test information of the business system.

13. The electronic device according to claim 9, the operation further comprising:
  releasing the edge computing nodes, in response to detecting that the edge computing nodes are in an idle state within preset time.

14. The electronic device according to claim 10 the operation further comprising:
  releasing the edge computing nodes, in response to detecting that the edge computing nodes are in an idle state within preset time.

15. The electronic device according to claim 9, the operation further comprising:
  analyzing service performance of the business system based on the second stress test information of the business system.

16. The electronic device according to claim 10, the operation further comprising:
  analyzing service performance of the business system based on the second stress test information of the business system.

17. A non-transitory computer readable storage medium, storing a computer instruction, wherein the computer instruction is used to cause a computer to perform an operation for testing a stress based on a cloud service, comprising:

acquiring, based on first stress test information of a business system in the cloud service and for each piece of expected stress test region information, a number of expected stress test nodes of the expected stress test region information based on stress test node information corresponding to the expected stress test region information, wherein the first stress test information comprises a plurality of pieces of the expected stress test region information of the business system and the stress test node information corresponding to each piece of the expected stress test region information;

creating edge computing nodes, a number of the edge computing nodes being identical to the number of the expected stress test nodes, wherein the edge computing nodes refer to business platforms constructed at an edge side of a network close to a user side, and positions of the edge computing nodes are between the user side and the cloud service; and performing a stress test on the business system by using the edge computing nodes, to acquire second stress test information of the business system.

\* \* \* \* \*